(12) United States Patent
Hikita et al.

(10) Patent No.: US 12,182,460 B2
(45) Date of Patent: *Dec. 31, 2024

(54) IMAGE FORMING DEVICE AND CONTROL METHOD FOR IDENTIFYING AN IMAGE QUALITY ABNORMALITY

(71) Applicant: TOSHIBA TEC KABUSHIKI KAISHA, Tokyo (JP)

(72) Inventors: Haru Hikita, Mishima Shizuoka (JP); Sou Miyazaki, Sunto Shizuoka (JP); Masaki Narahashi, Tokyo (JP); Hideyuki Kato, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,886

(22) Filed: Jul. 14, 2023

(65) Prior Publication Data
US 2023/0359407 A1    Nov. 9, 2023

Related U.S. Application Data

(63) Continuation of application No. 17/872,828, filed on Jul. 25, 2022, now Pat. No. 11,726,724.

(30) Foreign Application Priority Data

Aug. 20, 2021  (JP) .................................. 2021-135052

(51) Int. Cl.
   *G06F 3/12*     (2006.01)
   *H04N 1/00*     (2006.01)
   *H04N 1/32*     (2006.01)

(52) U.S. Cl.
   CPC ............ *G06F 3/121* (2013.01); *G06F 3/1234* (2013.01); *G06F 3/1256* (2013.01);
   (Continued)

(58) Field of Classification Search
   CPC ...... G06F 3/121; G06F 3/1234; G06F 3/1256; H04N 1/00344; H04N 1/00411; H04N 1/00461; H04N 2201/0094
   (Continued)

(56) References Cited

U.S. PATENT DOCUMENTS 9,124,739 B2   9/2015   Hosono et al.
10,990,344 B2  4/2021   Taguchi
(Continued)

FOREIGN PATENT DOCUMENTS

| JP | 2015-049656 A | 3/2015 |
| JP | 2016-118941 A | 6/2016 |
| JP | 2017-223807 A | 12/2017 |

OTHER PUBLICATIONS

Extended European Search Report dated Jan. 26, 2023 issued in EP Application No. 22191196.9, 6 pages.
(Continued)

*Primary Examiner* — Kent Yip
(74) *Attorney, Agent, or Firm* — FOLEY & LARDNER LLP

(57) ABSTRACT

An image forming device includes a printer, a display, and a controller. The printer forms a desired image indicated by image data on a sheet. The display displays the desired image. The controller receives a first designation, by a user, of a designation region of the desired image displayed on the display. The controller receives a second designation, by the user, of a superimposition position at which an abnormality region containing an abnormality is superimposed on the desired image. The controller transmits user designation information indicating the designation region and the superimposition position to an external device.

20 Claims, 7 Drawing Sheets

(52) U.S. Cl.
CPC ..... *H04N 1/00244* (2013.01); *H04N 1/00344* (2013.01); *H04N 1/00411* (2013.01); *H04N 1/00461* (2013.01); *H04N 1/32128* (2013.01)

(58) Field of Classification Search
USPC .............................................. 358/1.15, 1.18
See application file for complete search history.

(56) References Cited

U.S. PATENT DOCUMENTS

| | | |
|---|---|---|
| 11,303,762 B2 | 4/2022 | Takayama |
| 2013/0187954 A1* | 7/2013 | Saito ....................... G06T 11/60 345/634 |
| 2014/0270397 A1 | 9/2014 | Sochi |
| 2015/0169255 A1 | 6/2015 | Arakawa |

OTHER PUBLICATIONS

Notice of Allowance on U.S. Appl. No. 17/872,828 DTD Mar. 30, 2023.

* cited by examiner

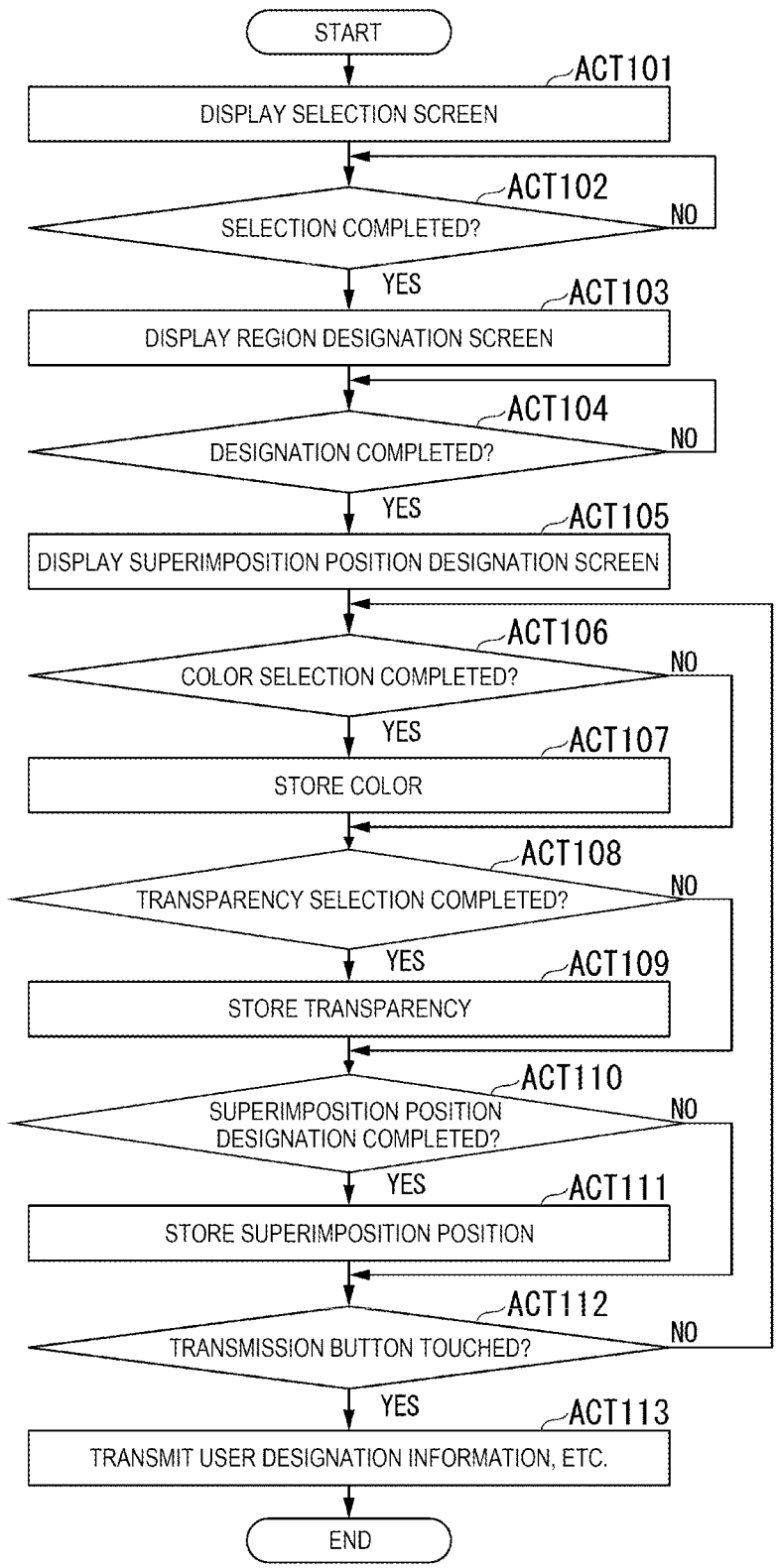

IMAGE FORMING DEVICE AND CONTROL METHOD FOR IDENTIFYING AN IMAGE QUALITY ABNORMALITY

CROSS-REFERENCE TO RELATED APPLICATIONS

This application is a continuation of U.S. application Ser. No. 17/872,828, filed on Jul. 25, 2022, which is based upon and claims the benefit of priority from Japanese Patent Application No. 2021-135052, filed on Aug. 20, 2021, the entire contents of each of which are incorporated herein by reference.

FIELD

Embodiments described herein relate generally to an image forming device and a control method.

BACKGROUND

In the related art, in an image forming device, an abnormality may occur in image quality of an image printed on a sheet, such as an image being printed with a shift. When such an image quality abnormality occurs, appropriate processing such as cleaning and part replacement is required according to the type of the image quality abnormality.

In general, since a user may not be familiar with the various types of image quality abnormalities, the user may not know how to properly address the abnormality. Therefore, the user makes an inquiry to a serviceman, but the user cannot appropriately notify the serviceman of the image quality abnormality when the user does not know the type of the image quality abnormality. When the serviceman cannot specify the type of the image quality abnormality, the serviceman cannot visit the user with a part necessary for processing the image quality abnormality in some cases. In this case, since the serviceman needs to visit again, service cost of the serviceman increases. In addition, the user experiences an extended delay before the image forming device can be used.

Therefore, the user is conceived to transmit an image with the image quality abnormality to the serviceman. In this case, although the serviceman can specify the type of the image quality abnormality, a security problem may occur in the transmission of the image. Based on such a background, several techniques of specifying the type of an image quality abnormality without transmitting an image with the image quality abnormality to a serviceman are proposed. Examples of such a technique include an image forming device that displays a plurality of images of an example of occurrence of an image quality abnormality and allows a user to select one of the images. In addition, an image forming device that allows a user to input the type of an image quality abnormality and position information of occurrence of the image quality abnormality is known.

However, in the above technique, an input operation of the user may become complicated depending on the type of the image quality abnormality.

DESCRIPTION OF THE DRAWINGS

FIG. 7 is a flowchart illustrating a processing flow of the image forming device.

DETAILED DESCRIPTION

In general, according to one embodiment, a technique capable of allowing a user to easily input information relating to an image quality abnormality is provided.

An image forming device according to an embodiment includes a printer, a display, and a controller. The printer forms a desired image indicated by image data on a sheet. The display displays the desired image. The controller receives a first designation, by a user, of a designation region of the desired image displayed on the display. The controller receives a designation, by the user, of a superimposition position at which an abnormality region containing an abnormality is superimposed on the printing image. The controller transmits user designation information indicating the designation region and the superimposition position to an external device.

In the image forming device according to an embodiment, a user can easily input information relating to an image quality abnormality. Hereinafter, the image forming device according to the embodiment will be described in detail.

Figure 1:
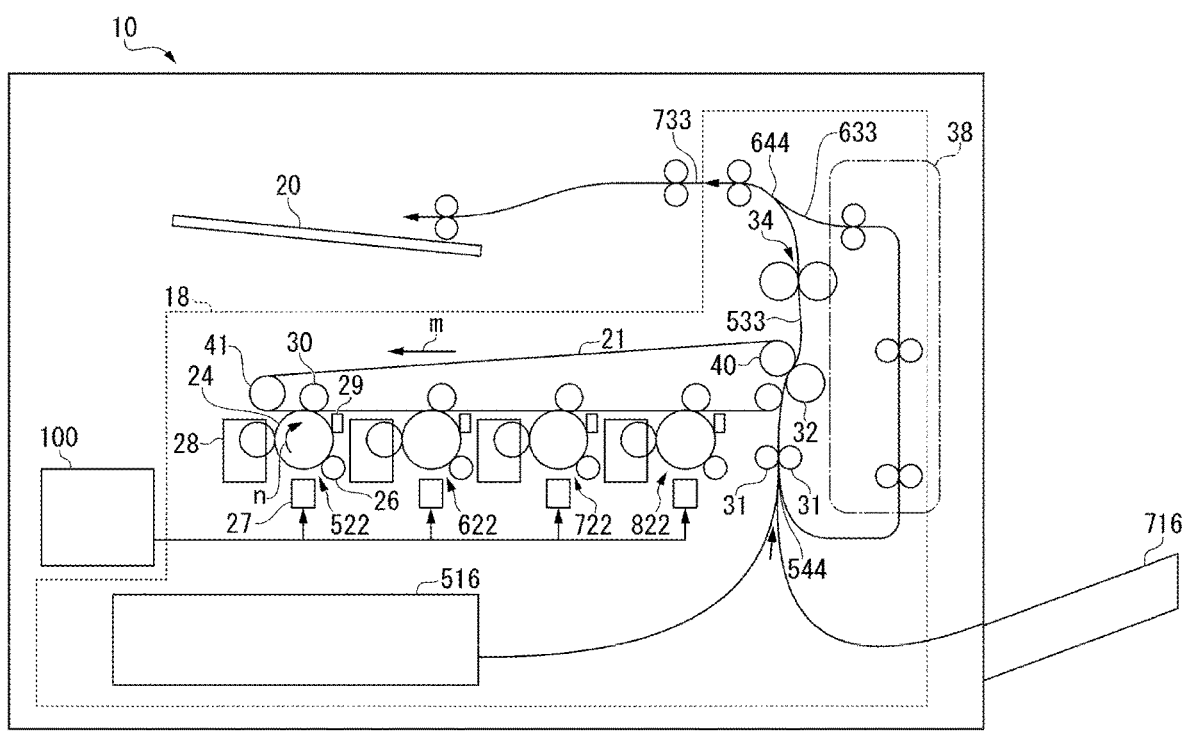
FIG. 1 is a side view of an image forming device according to an embodiment.

FIG. 1 is a side view of an image forming device 10 according to an embodiment. In FIG. 1, the image forming device 10 includes an image formation control unit 100 (e.g., a controller) and a printer unit 18 (e.g., a printer). The image formation control unit 100 controls the printer unit 18 and the like. The image formation control unit 100 controls conveyance of a medium, such as a sheet of paper or plastic film, (hereinafter, referred to as a "sheet") in the printer unit 18. The control of the conveyance of the sheet is to control conveyance timing of the sheet, a stop position of the sheet, a conveyance speed of the sheet, and the like.

A sheet feeding cassette 516 stores the sheet. For example, a material such as paper or a plastic film is used for the sheet.

The printer unit 18 is an example of the image forming unit. The printer unit 18 performs an image forming operation. For example, the printer unit 18 forms an image indicated by the image data on the sheet. In the following description, the formation of an image on a sheet is also referred to as printing. The printer unit 18 includes an intermediate transfer belt 21. The printer unit 18 supports the intermediate transfer belt 21 by a driven roller 41, a backup roller 40, and the like. The printer unit 18 rotates the intermediate transfer belt 21 in a direction of an arrow m.

The printer unit 18 includes four sets of image forming stations 522, 622, 722, and 822. The image forming stations 522, 622, 722, and 822 are used for forming images of yellow (Y), magenta (M), cyan (C), and black (K), respectively. The image forming stations 522, 622, 722, and 822 are arranged below the intermediate transfer belt 21 along a rotation direction of the intermediate transfer belt 21.

Hereafter, the image forming station 522 for yellow (Y) of the image forming stations 522, 622, 722, and 822 will be described as an example. Since the image forming stations 622, 722, and 822 have the same configuration as that of the image forming station 522, a detailed description thereof will be omitted.

The image forming station 522 includes an electrostatic charger 26, an exposure scanning head 27, a developing device 28 (e.g., a developer), and a photoreceptor cleaner 29. The electrostatic charger 26, the exposure scanning head 27, the developing device 28, and the photoreceptor cleaner 29 are arranged around a photoreceptor drum 24 rotating in a direction of an arrow n.

The image forming station 522 includes a primary transfer roller 30. The primary transfer roller 30 faces the photoreceptor drum 24 via the intermediate transfer belt 21.

In the image forming station 522, the photoreceptor drum 24 is charged by the electrostatic charger 26, and then exposed by the exposure scanning head 27. The image forming station 522 forms an electrostatic latent image on the photoreceptor drum 24. The developing device 28 develops the electrostatic latent image on the photoreceptor drum 24 using a two-component developer formed of a toner and a carrier.

The primary transfer roller 30 primarily transfers a toner image formed on the photoreceptor drum 24 onto the intermediate transfer belt 21. The image forming stations 522, 622, 722, and 822 form a color toner image on the intermediate transfer belt 21 by the primary transfer roller 30. The color toner image is formed by sequentially superimposing toner images of yellow (Y), magenta (M), cyan (C), and black (K). The photoreceptor cleaner 29 removes the toner remaining on the photoreceptor drum 24 after the primary transfer.

The printer unit 18 includes a secondary transfer roller 32. The secondary transfer roller 32 faces the backup roller 40 via the intermediate transfer belt 21. The secondary transfer roller 32 collectively and secondarily transfers the color toner images on the intermediate transfer belt 21 to the sheet. In the following description, the term "toner image" may be either the color toner image or a toner image of only one color. The toner image may be a toner image using a decolorable toner.

A conveyance path 533 is a conveyance path from a merging portion 544 to a branch portion 644. A conveyance path 633 is a conveyance path that passes through an inside of a duplex printing device 38, and is a conveyance path from the branch portion 644 to the merging portion 544. The conveyance path 733 is a conveyance path from the branch portion 644 to a sheet discharging tray 20.

A leading end of a sheet, which is picked up from the sheet feeding cassette 516 or a manual feeding tray 716, abuts against a portion where two stopped registration rollers 31 are in contact with each other. An inclination of the sheet abutting against the registration rollers 31 is corrected. The image formation control unit 100 starts rotation of the registration rollers 31 in accordance with a position of the toner image on the rotating intermediate transfer belt 21 to move the sheet to a position of the secondary transfer roller 32. The image formation control unit 100 secondarily transfers the toner image formed on the intermediate transfer belt 21 onto the sheet by the secondary transfer roller 32. The image formation control unit 100 conveys the sheet to the conveyance path 533 and fixes the toner image to the sheet (e.g., on a front side of the sheet) by a fixing device 34 (e.g.,a fixer, a heater, etc.) to form an image. The image formation control unit 100 conveys the sheet on which the image is formed to the conveyance path 733 to discharge the sheet.

For double-sided printing, the image formation control unit 100 conveys a sheet having an image formed on a front surface to the conveyance path 733. After the entire sheet passes through the branch portion 644 (e.g., in a forward direction), the image formation control unit 100 causes the sheet to switch back (e.g., move in a reverse direction), and conveys the sheet to the conveyance path 633. Thereafter, the image formation control unit 100 conveys the sheet to the merging portion 544 via the conveyance path in the duplex printing device 38, and conveys the sheet to the conveyance path 533 via the registration rollers 31. Then, the image formation control unit 100 fixes a toner image by the fixing device 34 to form an image on a back surface of the sheet. The image formation control unit 100 conveys the sheet having the image formed on a back surface to the conveyance path 733 to discharge the sheet.

Before the image formed in the printer unit 18 is secondarily transferred by the secondary transfer roller 32, an electrostatic latent image is formed on the photoreceptor drum 24 by the exposure scanning head 27. The electrostatic latent image formed on the photoreceptor drum 24 is primarily transferred onto the intermediate transfer belt 21 as a toner image. Further, the toner image primarily transferred onto the intermediate transfer belt 21 is secondarily transferred onto a radio tag sheet conveyed to a position of the registration rollers 31.

Next, a function block diagram of the image forming device according to the embodiment is described with reference to FIG. 2.

Figure 2:
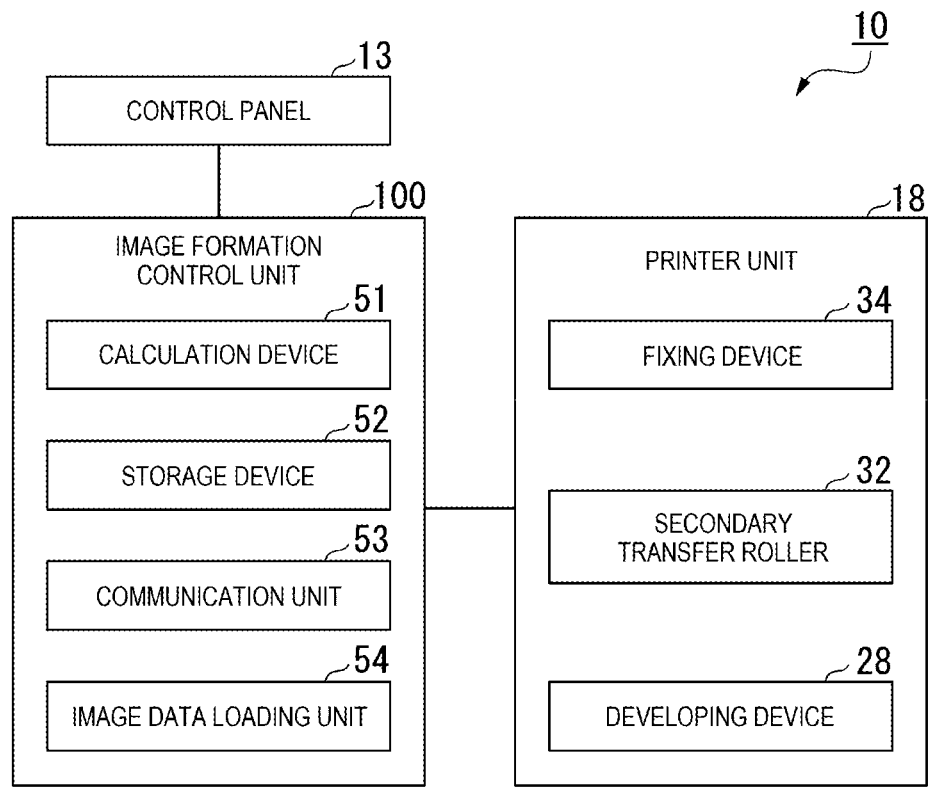
FIG. 2 is a function block diagram of the image forming device.

In FIG. 2, the image forming device 10 includes the image formation control unit 100, a control panel 13, and the printer unit 18.

The control panel 13 (e.g., a user interface) includes input keys (e.g., an input) and a display unit (e.g., a display, an output). For example, the input keys receive an input from the user. For example, the display unit is a touch panel (e.g., a touchscreen). The display unit receives the input from the user, and displays the input to the user. For example, the control panel 13 displays an item relating to an operation of the image forming device 10 on the display unit in a settable manner. The control panel 13 notifies the image formation control unit 100 of the item set by the user (e.g., a user input).

The image formation control unit 100 includes a calculation device 51 (e.g., a processor) and a storage device 52 (e.g., a memory). The calculation device 51 controls the control panel 13 and the printer unit 18 in accordance with an image processing program stored in the storage device 52.

The calculation device 51 is, for example, a central processing unit (CPU), an application specific integrated circuit (ASIC), and the like. The storage device 52 is a read only memory (ROM), a random access memory (RAM), a hard disk drive (HDD), a solid state drive (SSD), and the like.

A communication unit 53 (e.g., a network interface, a communication interface, etc.) controls overall communication of the image forming device 10. For example, the communication unit 53 performs communication via a local area network (LAN) or the Internet. The communication unit 53 receives printing data (for example, data described in a page description language) indicating an image to be printed from a host such as a personal computer (PC), and stores the received printing data in the storage device 52.

An image data loading unit 54 determines printing conditions based on the printing data that is received by the communication unit 53 and stored in the storage device 52 to load the printing data into data (for example, raster data) that can be printed by the printer unit 18 and store the data in the storage device 52.

The printer unit 18 includes the fixing device 34, the secondary transfer roller 32, the developing device 28, and the like described above. FIG. 2 shows only a part of a configuration of the printer unit 18 shown in FIG. 1. The printer unit 18 forms an image on a sheet based on the data that is stored in the storage device 52 by the image data loading unit 54.

Next, an example of an image quality abnormality will be described. In the following description, an image to be printed on a sheet by the printer unit 18 is referred to as a printing image (e.g., a desired image). An image actually printed on a sheet is referred to as a sheet image (e.g., a printed image or a resultant image). Specifically, the printing image is an image indicated by the printing data described above.

Figure 3A:
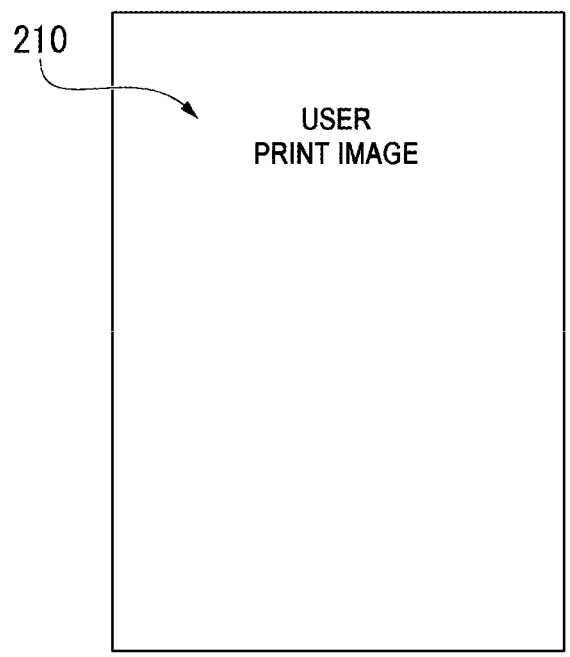
FIG. 3A is a diagram illustrating an example of hot offset.
Figure 3B:
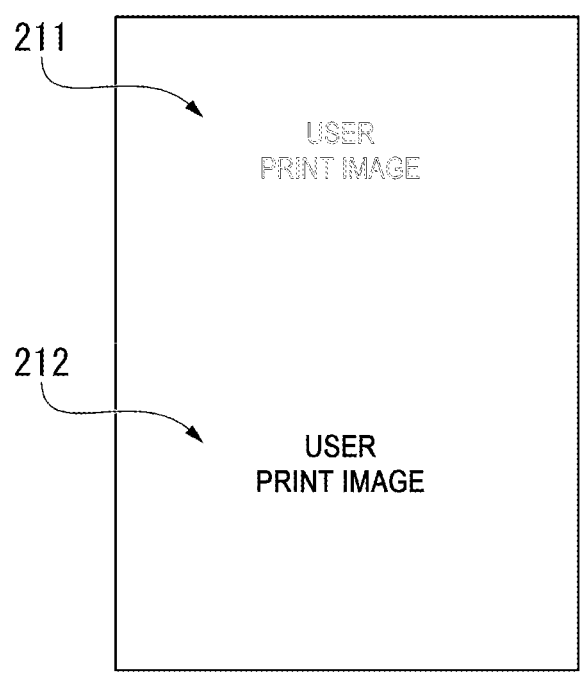
FIG. 3B is a diagram illustrating another example of the hot offset.

FIGS. 3A and 3B are diagrams each illustrating an example of a hot offset that is one of image quality abnormalities. The hot offset is an image quality abnormality that an image is stained by a toner moving to rollers constituting the fixing device 34.

FIG. 3A is a diagram illustrating the printing image. The printing image includes an image 210. The image 210 is an image indicating a character string "user print image". FIG. 3B is a diagram illustrating a sheet image in which the hot offset occurs. The sheet image includes an image 211 and an image 212.

The image 211 is a hollowed or otherwise faded image obtained by transferring a part of the "user print image" to the rollers constituting the fixing device 34. In addition, the image 212 is an image obtained by adhering the toner transferred to the fixing device 34 to a latter half of the sheet to pass the fixing device 34 after the image 211 passes through the fixing device 34. In this way, the hot offset is an image quality abnormality that the toner is adhered to a position shifted in the conveyance direction of the sheet on which the image is printed.

Figure 4A:
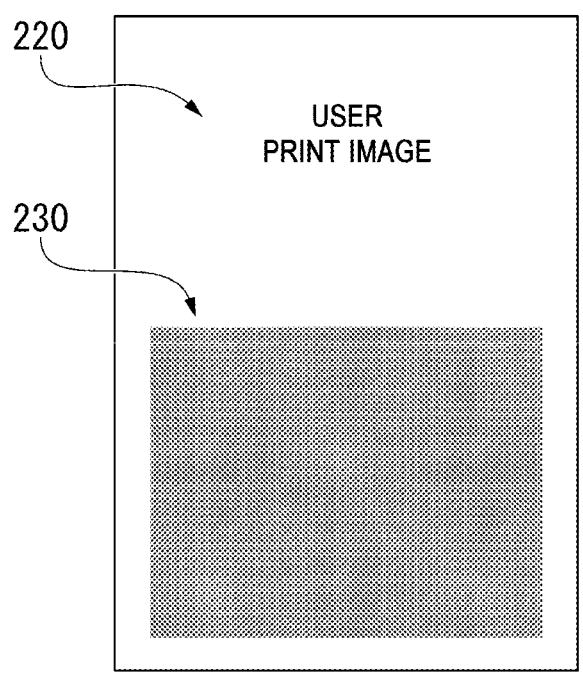
FIG. 4A is a diagram illustrating an example of a ghost.
Figure 4B:
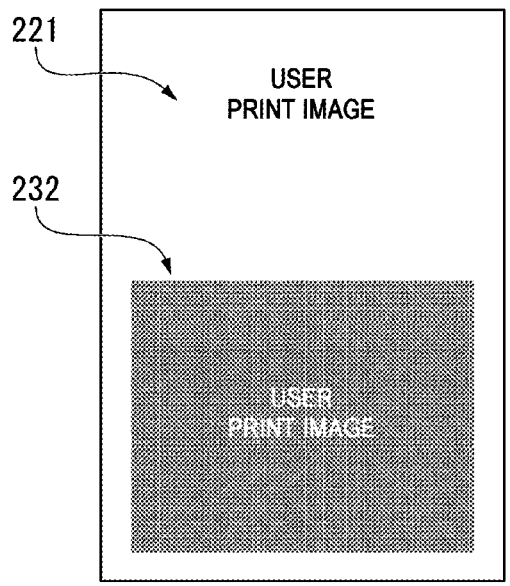
FIG. 4B is a diagram illustrating another example of the ghost.

FIGS. 4A and 4B are diagrams each illustrating an example of a ghost that is one of image quality abnormalities. The ghost is an image quality abnormality that an electrostatic latent image indicating the printing image remains on the photoreceptor drum 24 and unevenness occurs in an image printed thereafter due to the electrostatic latent image. The unevenness is often observed when the image printed thereafter is a halftone image (e.g., thin).

FIG. 4A is a diagram illustrating a printing image. The printing image includes an image 220 and an image 230. The image 220 is an image indicating the character string "user print image". The image 230 is a solid image.

FIG. 4B is a diagram illustrating a sheet image in which the ghost occurs. FIG. 4B includes an image 221 and an image 232. The image 221 is printed as the image 220 without any abnormality. On the other hand, the character string "user print image" is printed as unevenness on an image 232. In this way, the ghost is an image quality abnormality that unevenness occurs at a position shifted in a conveyance direction of a medium on which an image is printed.

Both the hot offset and the ghost are image quality abnormalities that a certain image appears again in the same size. Therefore, input of the image itself by a user is troublesome and difficult as described in the related art. In addition, even if the user simply designates a position, the type of the abnormality cannot be notified to a serviceman.

Figure 5A:
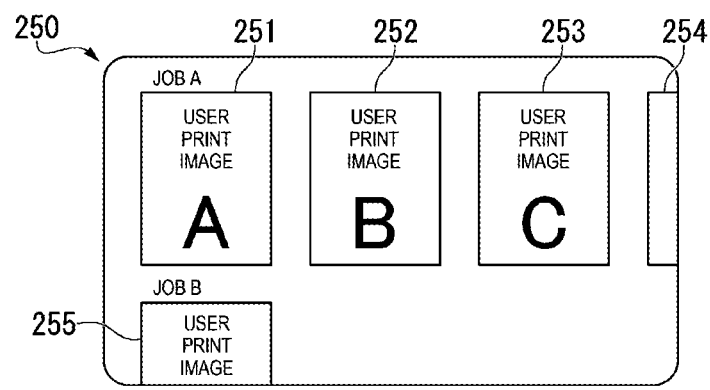
FIG. 5A is a diagram illustrating an example of a selection screen.
Figure 5B:
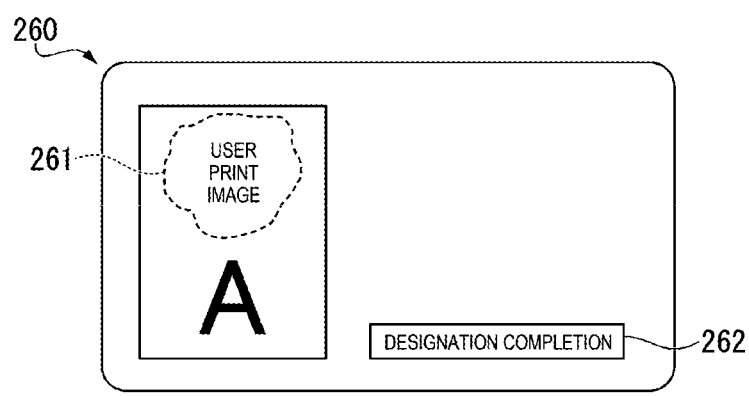
FIG. 5B is a diagram illustrating an example of a region designation screen.
Figure 5C:
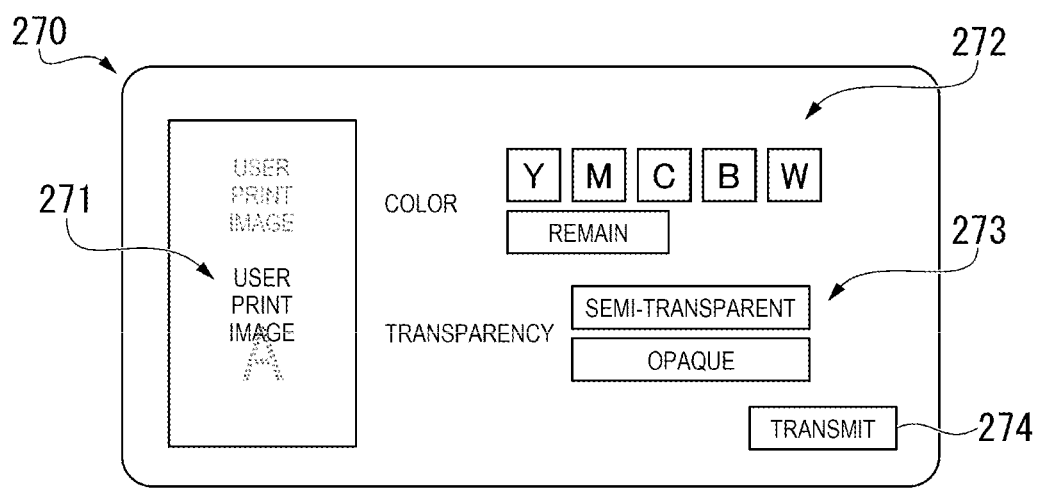
FIG. 5C is a diagram illustrating an example of a superimposition position designation screen.

Next, a user interface used for the user to input information relating to the image quality abnormality will be described. In the description of the user interface, a sheet image in which a ghost occurs is used as an example. FIGS. 5A, 5B, and 5C are diagrams each illustrating a screen displayed on the display unit of the control panel 13.

FIG. 5A is a diagram illustrating an example of a selection screen 250. The selection screen 250 is a screen for the user to select a printing image corresponding to a sheet image with an image quality abnormality. The image formation control unit 100 stores the printing image in the storage device 52 every time printing is performed. In addition, the image formation control unit 100 stores, together with the printing image, an image forming condition when the printing image is printed in the storage device 52 in association with the printing image. The image forming condition will be described below in detail.

A printing image is displayed on the selection screen 250 for each job. In FIG. 5A, printing images of two jobs of a job A and a job B are displayed. The "user print image", "A", "B", and the like in the printing image shown in FIG. 5A are images to be printed on the sheet, not character strings, codes, and the like for illustration.

As an example, the job A is a job in which four pages are printed. Printing images 251, 252, 253, and 254 are printing images in the job A. The printing image 251 is a printing image showing page 1, the printing image 252 is a printing image showing page 2, the printing image 253 is a printing image showing page 3, and the printing image 254 is a printing image showing page 4.

As an example, the job B is a job in which one page is printed. A printing image 255 is a printing image in the job B. The printing image 253 is a printing image showing page 1.

As shown in the job A, a printing image when the number of pages that are not fit in the selection screen 250 is printed can be displayed by a horizontal scroll by an operation of the user. In addition, a printing image of a job subsequent to the job B (e.g., a job C) can be displayed by a vertical scroll by an operation of the user. The user selects a printing image corresponding to the sheet image with an image quality abnormality in the selection screen 250.

When the printing image is selected, a region designation screen is displayed. FIG. 5B is a diagram illustrating an example of a region designation screen 260. The region designation screen 260 is a screen for the user to designate a region in the printing image. By way of example, the user may designate both a shape and a location of the region. The region here is a region containing an image in the printing image corresponding to an image with an image quality abnormality in the sheet image. In the following description, the image in the printing image corresponding to the image with an image quality abnormality is referred to as an "abnormal original image".

Examples of a method for designating a region include a method in which the user traces an image including the abnormal original image, on a display device with a finger, a stylus pen, and the like. As described above, since a touch panel is provided on the display device, the image formation control unit 100 can acquire a trajectory traced with a finger and the like. The designated designation region is displayed as a region 261 as illustrated in FIG. 5B (e.g., by displaying a boundary of the designated designation region as a dashed line). When the designation of the designation region is completed, the user touches a designation completion button 262. The user preferably designates the designation region by drawing a closed curve, but when the trajectory traced by the user is not a closed curve, the image formation control unit 100 interpolates two endpoints at both ends of the trajectory by a straight line to form a closed curve.

When the designation completion button 262 is touched, a superimposition position designation screen is displayed. FIG. 5C is a diagram illustrating an example of a superimposition position designation screen 270. The superimposition position designation screen 270 is a screen for the user to designate a superimposition position at which a same-shape region 271 (e.g., an abnormality region containing the abnormality) having the same shape as that of the designation region designated on the region designation screen 260 is superimposed on the printing image (e.g., the same-shape region and the designation region have a common shape). The superimposition position designation screen 270 illustrated in FIG. 5C shows a superimposition position designation screen after the superimposition position is designated.

Examples of a method for designating a superimposition position include a method in which a user touches a superimposition position or drags the region 261 to the superimposition position. The user designates a superimposition position at which a hot offset or a ghost occurs. When the superimposition position is designated, the image formation control unit 100 visually represents the abnormality displaying an in-region image (e.g., the abnormality) drawn in the designation region in a same-shape region 271 superimposed at the superimposition position. Accordingly, as illustrated in FIG. 5C, the abnormal original image is displayed on the printing image.

Further, a color and transparency can be designated on the superimposition position designation screen 270. The color is a color of the in-region image that is displayed in the region superimposed at the superimposition position. That is, the color is a color of the in-region image actually printed as the hot offset or the ghost. The user can select or not select a color by a corresponding color selection button 272. The user can select any one of yellow (Y), magenta (M), cyan (C), black (B), and white (W) as the color. When the color is not selected, the user selects "remain". As an example, each color of YMCKW is selectable in FIG. 5C, but the selectable color may be any color.

The transparency is transparency of the in-region image that is displayed in the region superimposed at the superimposition position. That is, the transparency is transparency of the in-region image actually printed as the hot offset or the ghost. The user can select either "semi-transparent" or "opaque" by a transparency button 273. For example, either "semi-transparent" or "opaque" can be selected in FIG. 5C, but any selection method or designation method may be used, such as a method in which the transparency can be designated by a ratio (%). The color and the transparency may be optionally selected.

When the user designates the superimposition position, selects the color and the transparency, and touches a transmission button 274, user designation information indicating a region designated on the region designation screen 260 and a superimposition position designated on the superimposition position designation screen 270 is transmitted to an external device, such as a server (not illustrated). The server is configured to be accessible by a serviceman (e.g., service personnel). The serviceman can view the user designation information by accessing the server.

The user designation information includes a selected color (including "remain") and transparency in addition to the region and the superimposition position. The color and the transparency may be optionally selected. When the color and the transparency are not selected, the user designation information includes information showing no selection.

In addition to the user designation information, condition information indicating the image forming condition is also transmitted. In the present embodiment, examples of the image forming condition include a transfer temperature, a life of a component (e.g., the photoreceptor drum 24), a primary transfer bias voltage, and a printing direction. The transfer temperature is a temperature at which the toner image is fixed to the sheet by the fixing device 34. The "life" indicates an elapsed time from a start of use of the photoreceptor drum 24, the number of rotations, and the like. The primary transfer bias voltage indicates a voltage applied to the electrostatic charger 26. The printing direction indicates a conveyance direction of the sheet when the printer unit 18 forms the printing image on the sheet. The above image forming conditions are examples, and the image forming condition is not limited to these examples.

Figure 6:
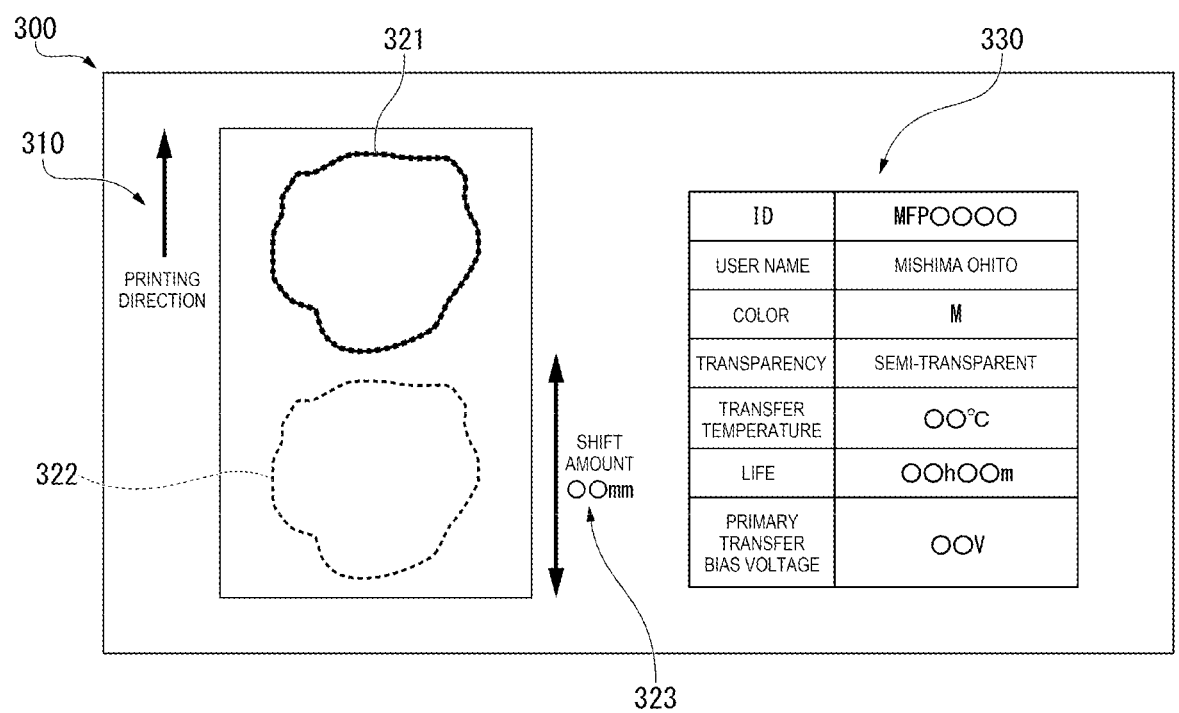
FIG. 6 is a diagram illustrating an example of a screen viewed by a serviceman.

As described above, the serviceman can view the region, the superimposition position, the color, the transparency, and the image forming condition. FIG. 6 is a diagram illustrating an example of a screen viewed by the serviceman. The screen is, for example, a screen displayed on a technician device, such as a personal computer (PC), smartphone, and the like.

In FIG. 6, a serviceman viewing screen 300 includes printing direction information 310, region information 321, abnormal image information 322, shift information 323, and a column 330 or table of various pieces of information. The printing direction information 310 indicates the printing direction of the image forming conditions by an arrow. The region information 321 indicates a region designated on the region designation screen 260. The region is indicated by a solid line.

The abnormal image information 322 indicates the superimposition position designated on the superimposition position designation screen 270. The abnormal image information 322 is displayed with the color selected by the color selection button 272 and the transparency selected by the transparency button 273. In addition, the region superimposed on the superimposition position is indicated by a broken line. A shift amount indicates a shift amount (mm) of the region and the superimposition position with respect to the printing direction.

The column 330 of various pieces of information is a column displaying items of "ID", "user name", "color", "transparency", "transfer temperature", "life", and "primary transfer bias voltage". The "ID" is identification information that uniquely identifies the image forming device 10. The "user name" indicates a name of a user of the image forming device 10. The "color" indicates a color selected by the color selection button 272. The "transparency" indicates transparency selected by the transparency button 273. The "transfer temperature", the "life", and the "primary transfer bias voltage" are described in the image forming conditions described above.

In this way, a serviceman can obtain detailed information on an abnormality. In addition, the region information 321 and the abnormal image information 322 are displayed to the serviceman as shown in FIG. 6, but contents of the image are not displayed at all, so that security can be ensured. The server or the image formation control unit 100 may have a function of estimating a component of the printer unit 18 that causes the image quality abnormality based on the shift amount, the color, and the transparency, and may display the component on the serviceman viewing screen 300.

FIG. 7 is a flowchart illustrating a processing flow of the image forming device 10. The processing is triggered by, for example, an operation of a user on the control panel 13. The image formation control unit 100 displays a selection screen (see FIG. 5A) (ACT 101). When the user completes the selection of the printing image (ACT 102: YES), the image formation control unit 100 displays the region designation screen (see FIG. 5B) (ACT 103). When the user completes the designation of the region (ACT 104: YES), the image formation control unit 100 displays the superimposition position designation screen (see FIG. 5C) (ACT 105).

The image formation control unit 100 determines whether the selection of the color is completed by the color selection button 272 (ACT 106). When the selection of the color is not completed (ACT 106: NO), the image formation control unit 100 proceeds to ACT 108. On the other hand, when the selection of the color is completed (ACT 106: YES), the image formation control unit 100 temporarily stores information indicating the selected color in the storage device 52 (ACT 107).

The image formation control unit 100 determines whether the selection of the transparency is completed by the transparency button 273 (ACT 108). When the selection of the transparency is not completed (ACT 108: NO), the image formation control unit 100 proceeds to ACT 110. On the other hand, when the selection of the transparency is completed (ACT 108: YES), the image formation control unit 100 temporarily stores information indicating the selected transparency in the storage device 52 (ACT 109).

The image formation control unit 100 determines whether the designation of the superimposition position is completed (ACT 110). When the designation of the superimposition position is not completed (ACT 110: NO), the image formation control unit 100 proceeds to ACT 112. On the other hand, when the designation of the superimposition position is completed (ACT 110: YES), the image formation control unit 100 temporarily stores information indicating the designated superimposition position in the storage device 52 (ACT 111).

The image formation control unit 100 determines whether the transmission button 274 is touched (ACT 112). When the transmission button 274 is not touched (ACT 112: NO), the image formation control unit 100 proceeds to ACT 106. On the other hand, when the transmission button 274 is touched (ACT 112: YES), the image formation control unit 100 transmits the user designation information and the image forming conditions (ACT 113) and ends the processing.

The image formation control unit 100 refers to the information stored in the storage device 52 in ACTs 107, 109, and 111, and transmits the user designation information to the above server. In addition, the image formation control unit 100 refers to the image forming conditions stored in the storage device 52 in association with the printing image selected in ACT 102, and transmits the image forming conditions.

The image formation control unit 100 stores the color in the above ACT 107, and when the display unit can perform color display, a region may be displayed with the selected color. The image formation control unit 100 stores the transparency in ACT 108, and a region may be displayed with the selected transparency.

The information indicating the region and the superimposition position, which is transmitted as the user designation information, may be, for example, image data indicating the region and the superimposition position. Alternatively, the information may be vector data of a closed straight line indicating the region and the superimposition position.

According to the embodiment described above, since a user only needs to designate a region or a superimposition position, the user can easily input information relating to the image quality abnormality.

While certain embodiments have been described, these embodiments have been presented by way of example only, and are not intended to limit the scope of the disclosure. These embodiments may be embodied in a variety of other forms, and various omissions, substitutions, and changes may be made without departing from the spirit of the disclosure. These embodiments and modifications thereof are included in the scope and spirit of the disclosure and are also included in the scope of the disclosure recited in the claims and the equivalent thereof

What is claimed is:

1. A method for identifying an image quality abnormality produced by an image forming device, the method comprising:
   displaying, by a display:
   a first screen including a plurality of desired images to be formed by the image forming device, the first screen being configured to receive a first designation by a user, the first designation indicating that a first desired image of the plurality of desired images includes the image quality abnormality;
   a second screen displaying the first desired image, the second screen being configured to receive a second designation by the user, the second designation indicating a designation region of the first desired image that corresponds in shape to the image quality abnormality; and
   a third screen displaying the first desired image, the third screen being configured to receive a third designation by the user, the third designation indicating the superimposition position at which the image quality abnormality is superimposed onto the first desired image.

2. The method of claim 1, wherein the second screen is displayed in response to the display receiving the first designation on the first screen.

3. The method of claim 1, wherein the second designation includes the user tracing a boundary of the designation region on the display.

4. The method of claim 1, wherein:
   the plurality of desired images includes a plurality of desired images from a first job and at least one desired image from a second job; and
   the first screen includes a first region containing the plurality of desired images from the first job and a second region containing the at least one desired image from the second job.

5. The method of claim 4, wherein the first region is a first row and the second region is a second row.

6. The method of claim 1, further comprising transmitting user designation information to an external device, the user designation information including at least one of (a) the designation region or (b) the superimposition position.

7. The method of claim 6, wherein the external device is a server that can be accessed by service personnel to review the user designation information.

8. The method of claim 1, wherein the image forming device includes the display.

9. A method for identifying an image quality abnormality produced by an image forming device, the method comprising:

displaying, by a display, a screen displaying a desired image to be formed by the image forming device, the screen being configured to receive a designation by a user, the designation indicating a superimposition position at which an image quality abnormality is superimposed onto the first desired image.

10. The method of claim 9, wherein, in response to receiving the designation, the screen displays the image quality abnormality superimposed onto the desired image at the superimposition position.

11. The method of claim 9, wherein the designation is a first designation and the screen is configured to receive a second designation by the user, the second designation indicating a color of the image quality abnormality.

12. The method of claim 9, wherein the designation is a first designation and the screen is configured to receive a second designation by the user, the second designation indicating a transparency of the image quality abnormality.

13. The method of claim 9, wherein the screen is a second screen, the desired image is a first desired image of a plurality of desired images to be formed by the image forming device, and the designation is a second designation, the method further comprising:
   displaying, by the display, a first screen including the plurality of desired images to be formed by the image forming device, the first screen being configured to receive a first designation by the user, the first designation indicating that the first desired image includes the image quality abnormality.

14. The method of claim 13, wherein:
   the plurality of desired images includes a plurality of desired images from a first job and at least one desired image from a second job; and
   the first screen includes a first region containing the plurality of desired images from the first job and a second region containing the at least one desired image from the second job.

15. The method of claim 14, wherein the first region is a first row and the second region is a second row.

16. The method of claim 13, further comprising transmitting user designation information to an external device, the user designation information including the superimposition position.

17. The method of claim 16, wherein the external device is a server that can be accessed by service personnel to review the user designation information.

18. The method of claim 13, wherein the image forming device includes the display.

19. A method of operating a display, the method comprising:
   displaying, by the display, a plurality of print images desired to be formed by an image forming device;
   receiving, by the display, a first selection indicating a first print image of the plurality of print images;
   receiving, by the display, a second selection indicating a designation region of the first print image; and
   receiving, by the display, a third selection of a superimposition position at which an image quality abnormality is superimposed onto the first print image, the image quality abnormality corresponding in shape to the designation region.

20. The method of claim 19, further comprising displaying, by the display, the image quality abnormality superimposed onto the first print image at the superimposition position.

* * * * *